United States Patent [19]

Oikarinen

[11] 4,016,896
[45] Apr. 12, 1977

[54] DEVICE FOR THE DE-AIRING OF A LIQUID SYSTEM, PREFERABLY A SYSTEM FOR HYDRAULIC BRAKES

[76] Inventor: Eino Heikki Oikarinen, Torehatts Backe 9, S-417 28 Goteborg, Sweden

[22] Filed: Nov. 7, 1975

[21] Appl. No.: 630,049

[30] Foreign Application Priority Data

Nov. 8, 1974 Sweden .............................. 7414038

[52] U.S. Cl. .............................. 137/205; 137/321; 251/149.8; 251/351
[51] Int. Cl.² ......................................... F16K 45/02
[58] Field of Search ................. 137/205, 321, 604; 141/59, 65; 251/149.8, 351

[56] References Cited

UNITED STATES PATENTS

| 2,083,866 | 6/1937 | Rice | 137/321 X |
| 2,682,886 | 7/1954 | Paxton | 137/205 |
| 3,074,423 | 1/1963 | Cox et al. | 137/205 |
| 3,318,330 | 5/1967 | Dobbs | 251/149.8 X |

Primary Examiner—Robert G. Nilson

[57] ABSTRACT

The present invention relates to a device for the de-airing of a system for hydraulic brakes. The device includes a pumping device continuously creating a vacuum and arranged to be connected via ducts to the de-airing nipples of the system. A connecting piece is provided for said connection and is adapted to be tightly fit to said nipples and to engage said nipples so that they can be turned.

4 Claims, 6 Drawing Figures

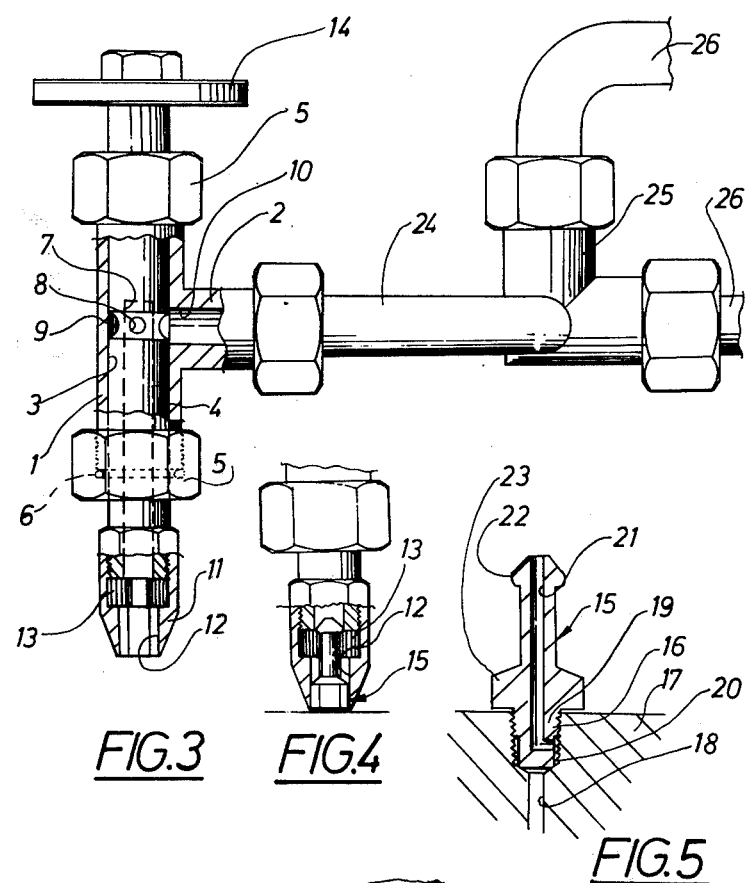
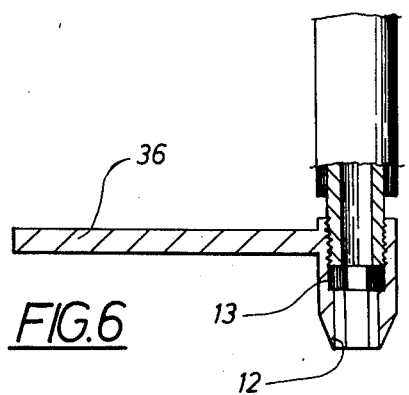

DEVICE FOR THE DE-AIRING OF A LIQUID SYSTEM, PREFERABLY A SYSTEM FOR HYDRAULIC BRAKES

The present invention relates to a device for the de-airing of a liquid system, preferably a system for hydraulic brakes, which system has a number of de-airing nipples acting as valves, and at least one duct arranged to be connected with said liquid system and with a pumping unit for removing the air and hydraulic liquid escaping through the nipples in connection with the de-airing operation.

It is an object of the invention to provide a device by means of which preferably the hydraulic brake system of a vehicle can be de-aired in a simple and quick manner with respect to the connection of the device to the brake system as well as the very de-airing procedure. In the prior art such de-airing involved a great many hoses in a rather complicated manner having to be connected to a number of de-airing nipples, which in their turn had to be changed between shut and open positions by means of special tools. Such de-airing equipment of known type further comprises a complicated apparatus for creating an underpressure and for taking care of let-out brake liquid.

The object of the invention is obtained by a device which is characterized by the pumping unit comprising a continuously operating pumping device exclusively creating a vacuum and arranged via said duct or ducts to be connected to only that one of the de-airing nipples through which de-airing at the time is desired, and by means of vacuum to remove the escaping air and the hydraulic fluid escaping through the nipples. At least one connecting piece is provided for the connection of the nipples of the respective duct, said connecting piece being arranged in a tight fit to be connected to one of the nipples on account of the vacuum created by the pumping device and to engage said nipple in an arranged grip for turning the same around.

In the accompanying drawings an example of an embodiment of the invention is illustrated, viz. a de-airing device for de-airing the hydraulic brake system of a motor vehicle.

In the drawings

FIG. 3 is a partly broken view of the connecting detail;

FIG. 4 shows a portion of the connecting detail of FIG. 3 in connected position;

FIG. 5 is a view of a de-airing nipple on a larger scale than the one used in the previous figures, and FIG. 6 is a view of a connecting detail of a second embodiment.

A vehicle with a hydraulic brake system is provided with a great many de-airing nipples, at least one nipple for each brake cylinder. For safety's sake many modern vehicles are equipped with double hydraulic brake systems, which means that at least certain ones of the wheel assemblies are equipped with several brake cylinders and consequently also with several de-airing nipples. When brake fluid is filled into the system, the air of the system has to be permitted to escape, which takes place by opening the de-airing nipples, while liquid is being filled into the system. In connection with the de-airing, a certain quantity of hydraulic liquid will also escape through the de-airing nipples, and in order to prevent this liquid from being lost and from contaminating the environment of the working place, one provides the de-airing nipples with hoses, which lead to a pumping device. In said pumping device a certain underpressure is created, which facilitates the de-airing, and from the pumping device the escaping fluid can be conducted to a collecting tank. The pumping device is in principle a vacuum pump, thus a comparatively complicated apparatus.

Figure 1:
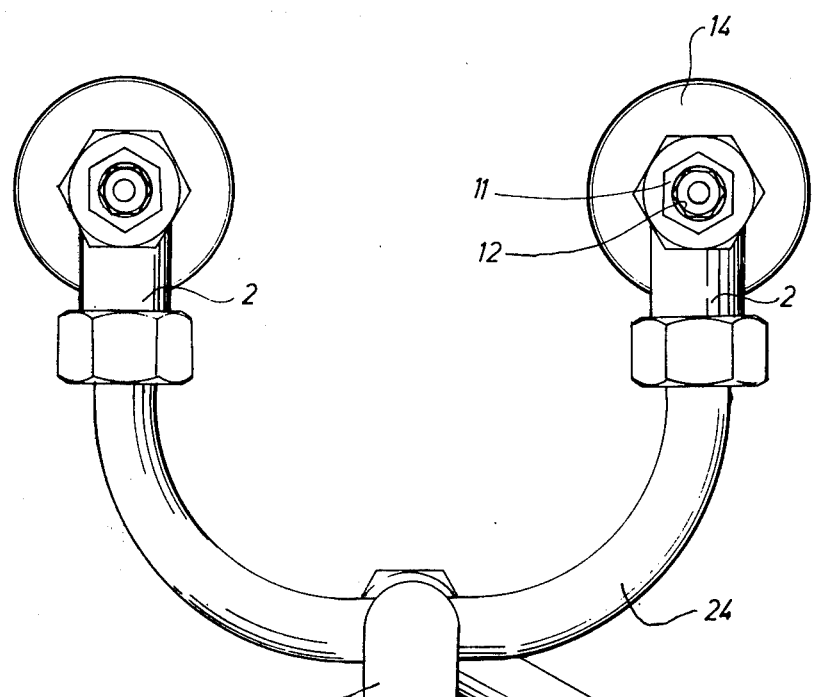
FIG. 1 shows a front view of a connecting detail.

In connection with the following description of the invention the hoses mentioned have been provided with special connecting pieces for quick connection to the de-airing nipples, which connections at the same time are designed as tools for turning on and off the de-airing nipples in connection with their opening and closing operations. In the prior art one required special tools for this operation. In the device according to the invention the hoses from the connecting pieces lead to a pumping device, which is designed as an ejector pump, which permits it to be of a very simple design and to be driven by means of compressed air, which generally is available at the working place. According to the FIGS. 1 and 3 a connecting piece comprises a valve body 1 with a connecting branch 2 and a central bore 3. In the central bore 3 there is a spindle 4, which is rotatably journalled and kept in place by means of cap nuts 5, by which the spindle 4 is sealed in the bore 3 by means of O-rings 6.

The spindle 4 in its turn has a central bottom hole 7 with a branch bore 8, which leads into a down-turned portion 9, which in the intended position of the spindle 4 is right in front of a discharge port 10 of the branch 2. An end-nipple 11 is screwed onto the end of the spindle 4, where the bottom hole 7 discharges, said nipple having an outlet 12 with hexagonally arranged inner walls. The end nipple 11 is well locked on its thread and houses an elastic bushing 13 provided with a hole. At the end of the spindle 4 opposed to the end nipple 11 a wheel 14 is provided for turning the spindle.

A de-airing nipple 15 is illustrated in FIG. 5. This nipple by means of a threaded part 16 is screw-fastened into the body 17 of for instance a brake cylinder, which has a bore 18, which is in communication with the hydraulic brake system. The projecting portion 19 provided with the thread 16 exhibits a down-turned portion 20, the end of which is arranged to bear against the bottom of the threaded hole of the body 17. From the down-turned portion 20 a bore part passes into a bore 21 extending along the nipple 15, said bore 21 leading to the outer end of the nipple. The outer end of the nipple 15 has a collar shaped portion 22 for the connection with a hose, and therebehind is a portion designed as an hexagonal nut to be gripped with a spanner. As is evident from the FIG. 4, which illustrates the connecting piece connected to the nipple 15, the inner hexagonal bore 12 is adapted to the hexagon 23, and the resilient bushing 13 is intended with a tight fit to be thread over the portion 22.

The de-airing device shall comprise a connecting piece according to FIG. 3 for each de-airing nipple 15. In connection with such wheel assemblies, where several de-airing nipples are arranged, it may be practical, if several connecting pieces are rigidly interconnected, according to FIG. 1 by means of a tube 24 connected with one of the branch ducts 2 of the connecting piece. This tube 24 in its turn exhibits a branch 25, which is arranged for connection to hoses 26, which lead to an adjacent connecting piece and the pumping device of FIG. 2 respectively.

Figure 2:
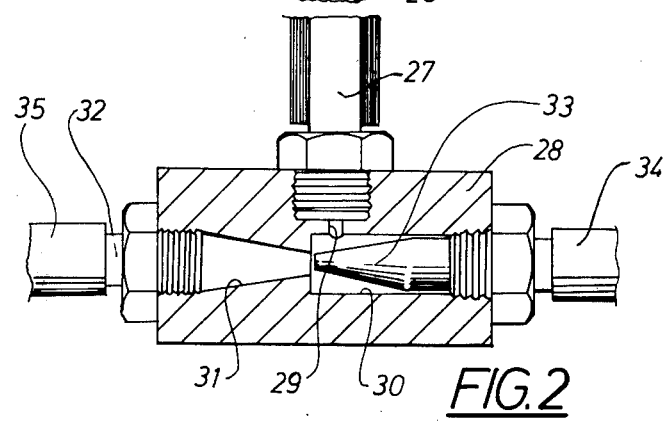
FIG. 2 is a cross sectional view of a pumping device.

As is evident from the above the different connecting pieces thus are interconnected and together connected with the pumping device of FIG. 2 by means of an admission port nipple 27 on the same.

According to FIG. 2 the pumping device comprises a housing 28, in which said admission port nipple 27 ends in a small hole 29. The hole 29 leads into a chamber 30, which in its turn passes into a conically widening chamber 31, to which an outlet port nipple 32 is fitted. In the chamber 30 a mouth piece 33 is provided which by means of a hose 34 is connected with a circuit of compressed air. The outlet port nipple 32 is by means of a hose 35 connected with a collecting tank for hydraulic liquid.

A variant of the connecting piece is illustrated in FIG. 6. The difference between this variant and the embodiment according to FIG. 3 consists in said nipple with the hexagon 12 and the resilient bushing 13 being arranged to be turned around by means of a bar 36, which thus replaces the wheel 14.

When de-airing the brake system of a vehicle, the connecting pieces in due order are pressed onto the respective de-airing nipples 15 as shown in FIG. 4. The nipples now via the tubes and the hoses mentioned are tightly connected with the pumping device according to FIG. 2. The nipples can now be opened in a simple manner by pivoting of the spindle 4 by means of the wheel 14 (respectively the bar 36), the hexagon 12 thereby serving as a spanner. Hydraulic fluid can now be filled into the system, while compressed air is injected through the mouth piece 33. By ejector effect an underpressure thereby is created in the chamber 30. The air, which by means of the liquid has been driven out of the system, is rapidly removed via the nipples 15, which, because of their having been slightly unscrewed, do no longer have a tight fit against the bottom of the respective threaded bore, and via the hose system by means of said underpressure. The same goes for the liquid, which sooner or later will be pressed out through the de-airing nipples. The liquid is carried away and out together with the air through the hose 35 and can be separated and collected. The de-airing can be carried out by one single operator, as the device described does not require attention, while the brake pedal is operated in order to assure that the liquid will reach all parts of the system. By this arrangement and by the connection being so simple a considerable saving of labour is obtained compared with working methods and equipment of the prior art.

I claim:

1. A device for de-airing a liquid system having de-airing nipples designed as valves which when turned will open, said device comprising: a pumping device adapted to exclusively create a continuous vacuum; at least one duct connected to said pumping device and having one end to be connected to one of the de-airing nipples; a connecting piece mounted on said one end of said duct; turning means associated with said connecting piece for engagement with the respective de-airing nipple when the latter is connected to said duct to thereby open the valve; and vacuum-influenced tightening means for tightening the connection between said duct and the respective de-airing nipple.

2. A device according to claim 1, wherein the pumping device is an ejector pump adapted to be driven by compressed air.

3. A device according to claim 1, wherein said connecting piece comprises a shaft portion connected to said duct and provided with a first channel communicating with said duct, and a tool portion turnably connected to said shaft portion and comprising said turning means, said tightening means, and a second channel maintaining a communication between said first channel and the de-airing nipple.

4. A device according to claim 1, wherein said tightening means comprises a resilient bushing adapted to be sealingly pressed onto the de-airing nipple and to keep the connecting piece in place fitted to the nipple.

* * * * *